Nov. 15, 1960

W. P. HARRIS ET AL 2,960,652

BRIDGE METHOD FOR THE MEASUREMENT OF CORE
LOSSES IN FERROMAGNETIC MATERIAL
AT HIGH FLUX DENSITIES

Filed Nov. 26, 1958

INVENTORS
William P. Harris
Irvin L. Cooter

BY Arthur Vinogrod

ATTORNEY

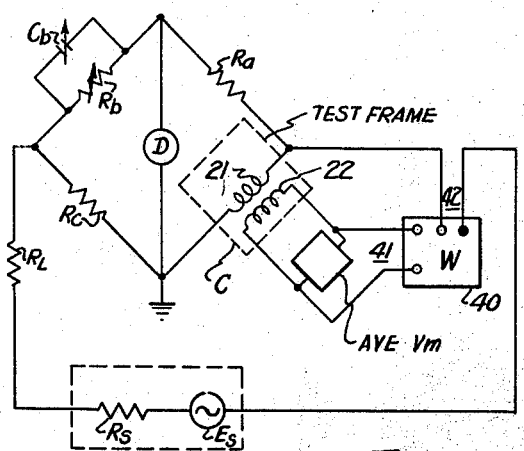
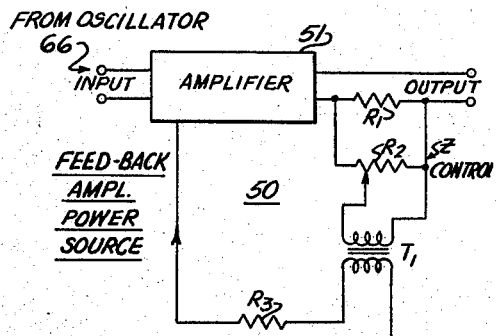
Fig. 4
Fig. 5
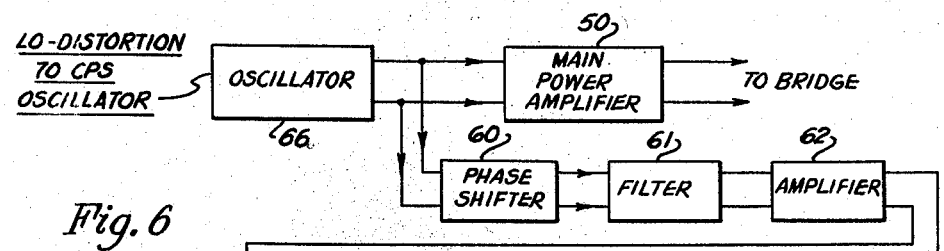
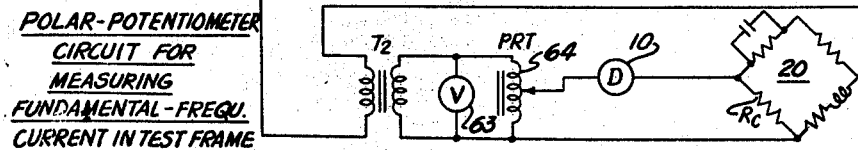
Fig. 6
POLAR-POTENTIOMETER CIRCUIT FOR MEASURING FUNDAMENTAL-FREQU. CURRENT IN TEST FRAME
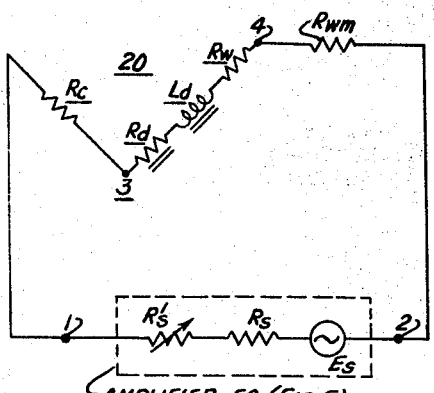
Fig. 7
INVENTOR
William P. Harris
Irvin L. Cooter
BY
ATTORNEY INVENTORS
William P. Harris
Irvin L. Cooter
BY
ATTORNEY United States Patent Office 2,960,652
Patented Nov. 15, 1960

2,960,652

BRIDGE METHOD FOR THE MEASUREMENT OF CORE LOSSES IN FERROMAGNETIC MATERIAL AT HIGH FLUX DENSITIES

William P. Harris, Washington, D.C., and Irvin L. Cooter, McLean, Va., assignors to the United States of America as represented by the Secretary of Commerce Filed Nov. 26, 1958, Ser. No. 776,651

10 Claims. (Cl. 324—34)

This invention relates to electrical measurements and particularly contemplates an improved apparatus enabling the direct determination of core losses in ferromagnetic materials at relatively high flux densities.

An exact knowledge of the total core loss and its components is of vital importance in the design of electrical components involving ferromagnetic materials that are subject to changes in direction or magnitude of magnetic flux. Such information is normally obtainable from measurements made on strip samples employing an Epstein frame and a wattmeter. Where increased sensitivity and greater frequency range is desirable a bridge method is employed as described in an article by Cooter and Harris Jour. Res. NBS, vol. 57 No. 2, August 1956, pages 103–112.

As described in such article, an A.C. bridge method is employed for measurement of core losses in ferromagnetic material at high flux densities. Such bridge method, however, is subject to errors as large as several hundred percent if the effect of current distortion is neglected.

Current distortion arises from the fact that even if the bridge circuit is excited by pure sinusoidal A.C., the core undergoing test, which forms one arm of the bridge, causes current waveform distortion. Consequently, accurate values of core loss can be obtained at higher flux densities only if the observed values are corrected by the application of a term derived from the harmonic components of the exciting current. In accordance with the method described in the referred-to article, the necessary correction factors are obtained by successively measuring the individual harmonic currents.

The present invention contemplates an apparatus which obviates the need for applying a harmonic power correction. Since terms as high as the 13th harmonic are encountered in making a core loss measurement with an A.C. bridge, it is apparent that the harmonic power correction method is relatively complicated and slow and requires very accurate measurements.

In accordance with the principles of the present invention an accurate determination of the core losses in ferromagnetic materials can be made without the need for making a harmonic power correction. Specifically, the power source for energizing the measuring circuit is in the form of a power amplifier provided with current feedback in such a manner as to make the circuit self-compensating in respect to harmonic power. The result is that accurate measurements can be made more conveniently than by the previous methods described in the above article.

It is accordingly an immediate object of the present invention to provide an improved bridge circuit for the measurement of core losses in ferromagnetic materials at relatively high flux densities.

A further object of this invention is to provide an apparatus by which direct measurement of such core losses can be made without involved measurement procedures and computations.

Another object of the invention is to provide an improved core loss measuring circuit in which the effect of the resistance of the measuring circuit is substantially eliminated by applying an equivalent amount of negative resistance through feedback in the power source.

Other uses and advantages of the invention will become apparent upon reference to the specification and drawings, in which:

Figs. 2–4 are circuit diagrams for explaining certain principles involved in which:

Fig. 2 is a diagram showing a basic Maxwell-Wien bridge circuit for measuring core losses using an Epstein test frame;

Fig. 3 is an equivalent circuit diagram of the circuit shown in Fig. 2, and

Fig. 4 shows the manner of including a wattmeter in the test circuit of Fig. 2 in order to make simultaneous measurements;

Fig. 5 is a block schematic diagram of the amplifier employed as the power source for the bridge in accordance with the principles of the present invention showing the means for controlling the output impedance to provide the necessary degree of equivalent negative resistance;

Fig. 6 is a further circuit detail illustrating the principles of the polar-potentiometer method of determining the voltage drop across one arm of the measuring bridge;

Fig. 7 is a portion of the circuit of the present invention showing how compensation for part of the circuit resistance may be achieved by varying the negative source resistance;

Figure 2:
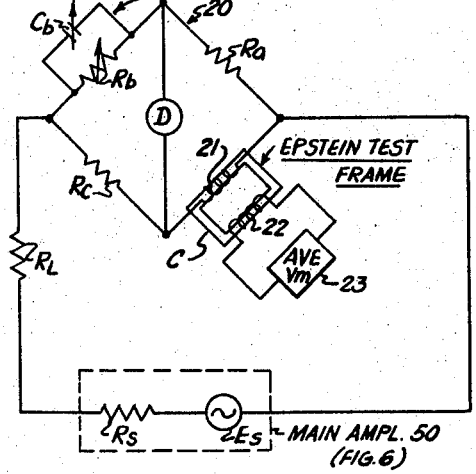
Figure 3:
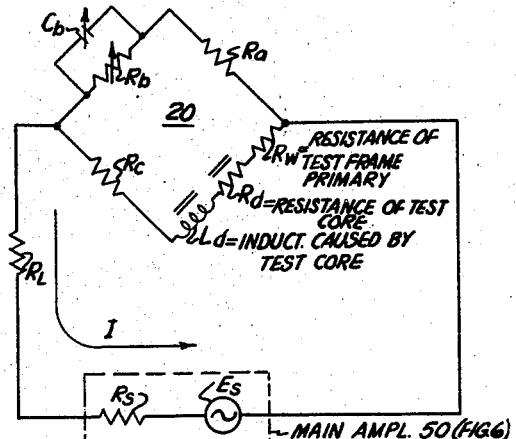

The basic principle involved in the bridge measurement of core losses is illustrated in Fig. 2. Fig. 2 shows a Maxwell-Wien bridge 20 in which the test core C to be measured is included in one arm of the bridge by means of an Epstein-type of test frame. Fig. 3 is an equivalent circuit of Fig. 2, like parts being designated by like reference numerals. The inductance and resistance caused by the presence of the ferromagnetic material or the core under test is designated as $L_d$ and $R_d$ in Fig. 3.

It will be apparent that each of the parameters ($R_d$, $L_d$) are necessarily nonlinear because of the nature of the hysteresis cycle of the material under test. Such nonlinearity gives rise to harmonic frequency components in the current I (Fig. 3) even though the source voltage $E_s$ supplies a distortionless sine wave signal. It is the power dissipated at these harmonic frequencies in the resistive elements of the circuit that gives rise to the corrections necessary when this circuit is used to measure core l ses at high flux densities. In Figs. 2–4, the power source in the form of an amplifier 50 to be described is designated by the voltage $E_s$ and resistance $R_s$.

Referring to Figs. 2 and 3, the test frame illustrated in Fig. 2 represents the Epstein frame as specified by the American Society for Testing Materials, Part I, Section A43–54 (1955). In accordance with such test principles the Epstein test specimen comprises flat rolled material cut into strips approximately 3 cm. wide and at least 25 cm. long. Such strips are assembled in the four arms of an Epstein test frame with double lap joints at the corners. In accordance with the construction of the present invention the Epstein test frame is incorporated in one arm of the bridge by means of the 700-turn primary winding 21 of the test frame. An average indicating voltmeter 23 is connected to the secondary winding 22.

As further illustrated in Figs. 2 and 3 resistance $R_a$ and $R_c$ represent the "product" arms of the bridge, and $R_b$ and $C_b$ are adjustable resistance and capacitance respectively for balancing the bridge 20. $R_L$ resignates the resistance of the leads and contacts involved in the circuitry.

In accordance with known bridge methods for the determination of core losses as above referred to, the losses are computed from the product $$I^2 R_d \tag{1}$$

where I represents the R.M.S. value of the current and $R_d$ is the resistance associated with the ferromagnetic test material in the test frame. The value of $R_d$ is usually determined at the fundamental frequency from the bridge balance equations and the values $R_a$, $R_b$, and $R_c$, when the bridge is balanced as indicated by the tuned detector D. As fully detailed in the above-referred-to article the term $I^2 R_d$ includes not only the power dissipated in the test core but also all the power dissipated at harmonic frequencies in all of the linear resistive elements in the circuit. The true core loss is then determined from the equation:

$$P_c = I_1^2 R_d - \Sigma I_h^2 R_p \tag{2}$$

where $I_1$ represents the fundamental frequency component of the exciting current. $I_h$ represents the harmonic current components and $R_p$ is the ohmic or D.C. resistance of the circuit.

While the correction term $\Sigma I_h^2 R_p$ is negligible at low flux densities, it increases very rapidly at flux densities above 12 or 13 kilogausses in ordinary silicon-iron core materials, becoming several times as large as the true core losses as saturation is approached. It is therefore necessary to accurately measure and subtract the term $\Sigma I_h^2 R_p$ in Equation 2 in order to determine the power loss $P_c$ accurately. The determination of the correction term in the above equation is, however, burdensome. For example, if the value of the term $I_h^2 R_p$ is $4 \times P_c$ then to attain accuracy of 2% in the measurement of $P_c$ it is necessary to measure $\Sigma I_h^2 R_p$ to better than 0.5%. While such accuracy of measurement is obtainable, rather complicated procedures are involved and the method is inconvenient. The measurement of each significant harmonic current (including harmonics as high as the 13th) is involved at the highest flux densities measured, along with the determination of $R_p$, the circuit resistance, taking into account the changes of resistance with changing temperature. The measurement of $R_p$, the circuit resistance, is further complicated by the fact that it includes the source resistance $R_s$.

The present invention provides a more convenient method of making core loss measurements with an accuracy of one or two percent. To achieve such end means are provided to reduce the above-referred-to correction term $\Sigma I_h^2 R_p$ to zero. It is obvious that such expression can be reduced to zero only if either the harmonic currents $I_h$ are eliminated or if the ohmic resistance $R_p$ can be reduced to zero. Although it is possible to suppress harmonics in the exciting current, this procedure is undesirable because it produces harmonics in the secondary voltage of sufficient amplitude to seriously distort the waveform. Therefore, in accordance with the principles of the present invention, the value of $R_p$ is effectively reduced to zero.

Since $R_p$ is the total resistance of the test circuit it will be obvious that the determination of such value necessitates consideration of resistances which are very difficult to measure—namely, the circuit resistance introduced by the test frame winding and the circuit resistance introduced by leads, terminals, switch contacts, power source etc.

While it is common practice to reduce the resistance of the primary circuit to a minimum, there is a limit as to how far this can be carried by the usual means, such as using heavier wire, short leads, lower valued bridge arms, etc. That is, in order for the bridge to be practicable, $R_c$ must have a value high enough to be measured conveniently. Therefore, it has been found that approximately one ohm is the lowest practical value for $R_c$. The test frame winding, however, has appreciable resistance ranging from 0.2 ohms to several ohms for practical sizes. In addition, leads, power source, switches, etc. unavoidably add their contributions bringing the least practicable value of primary resistance to more than 2 ohms in most cases.

In order to reduce the total ohmic resistance $R_p$ to zero the present invention provides means for compensating for such total resistance by the addition of an equivalent absolute value of negative resistance. To achieve such result the present invention contemplates the use of electronic circuits having negative resistance properties such as a feedback amplifier. Feedback is used to control the internal impedance of the amplifier in a known manner so that any degree of effective negative resistance to compensate for the value of $R_p$ is easily obtainable.

In connection with the present invention a high-quality, 200-watt amplifier is employed. The amplifier is provided with a feedback loop for achieving stable, distortion-free operation over a wide frequency range. In addition, a special current feedback loop is employed to alter the output impedance thus making it possible to achieve reasonable values of negative impedance with controllable stable operation. The essential elements of such feedback circuitry, the means employed to adjust it to give exactly the correct magnitude of negative resistance to counteract the positive resistance of the circuit together with the manner in which such amplifier is integrated into a measuring bridge circuit for determination of core losses will now be described.

Before proceeding with a detailed description of the invention it must be stated that in order to provide a comparison for determining the accuracy of the present invention, reference measurements made under identical conditions are necessary. As shown in Fig. 4, a wattmeter 40 is provided with its potential coil 41 connected to the secondary 22 of the test frame and its current coil 42 in series with the bridge circuit. The bridge arm $R_a$ is disconnected when reading the wattmeter in order to eliminate the small current in the parallel path through $R_a$, $R_b$, $C_b$. To obtain the comparative results which are summarized in Fig. 9A to be described, all measurements were made in simultaneous pairs using the test circuit of Fig. 4 and that of the present invention respectively.

The amplifier arrangement employed for exciting the bridge according to the present invention is illustrated in Fig. 5. As previously noted, such power source for the bridge must have the property of presenting an apparent internal impedance that is negative, and of precisely controllable magnitude in order to compensate for $R_p$, the circuit resistance. In order to obtain precise measurements the output voltage of the source must be very stable in magnitude, because the impedance of the test frame including the ferromagnetic core is a function of the current in the primary winding. At high flux densities, a small variation in the source voltage would cause a relatively large change in the bridge balance parameters.

To achieve the desired characteristics the present invention employs a high-quality, high-power, power amplifier having a special feedback circuit. As shown in Fig. 5, the feedback amplifier 50 comprises a high-power amplifier 51 such as a McIntosh 200-watt amplifier. The voltage developed across resistor R1 provided in the output of amplifier 51 is fed back to the input of the amplifier through a grounded isolating transformer T1 and a resistor R3. A potentiometer R2 provides a control for varying the amount of feedback by minute increments. The resistor R1 should have resistance ranging from 0.1 to 1 ohm and is the type that has low residual inductance or capacitance. The potentiometer resistor R2 may be in the form of a ten-turn precision potential divider providing precise control. Variation of the position of the tap of the potentiometer R2 has the effect of varying the apparent source impedance and therefore this control will be referred to as an impedance or "Z" control. The transformer T1 provides isolation and is capable of handling a range of frequencies wide enough to include the fundamental and all significant harmonics with a minimum of phase shift or attenuation. In the actual construction of the circuit a small amount of phase shift in the feedback circuit may be corrected by a simple R-C correction network. Before discussing the functioning of the power amplifier in connection with the measuring circuit as a whole, it is necessary to first describe the manner employed in obtaining the fundamental frequency current corresponding to $I_1$. Such determination is necessary for the measurement of core loss as is apparent from Equation 2.

Figure 1:
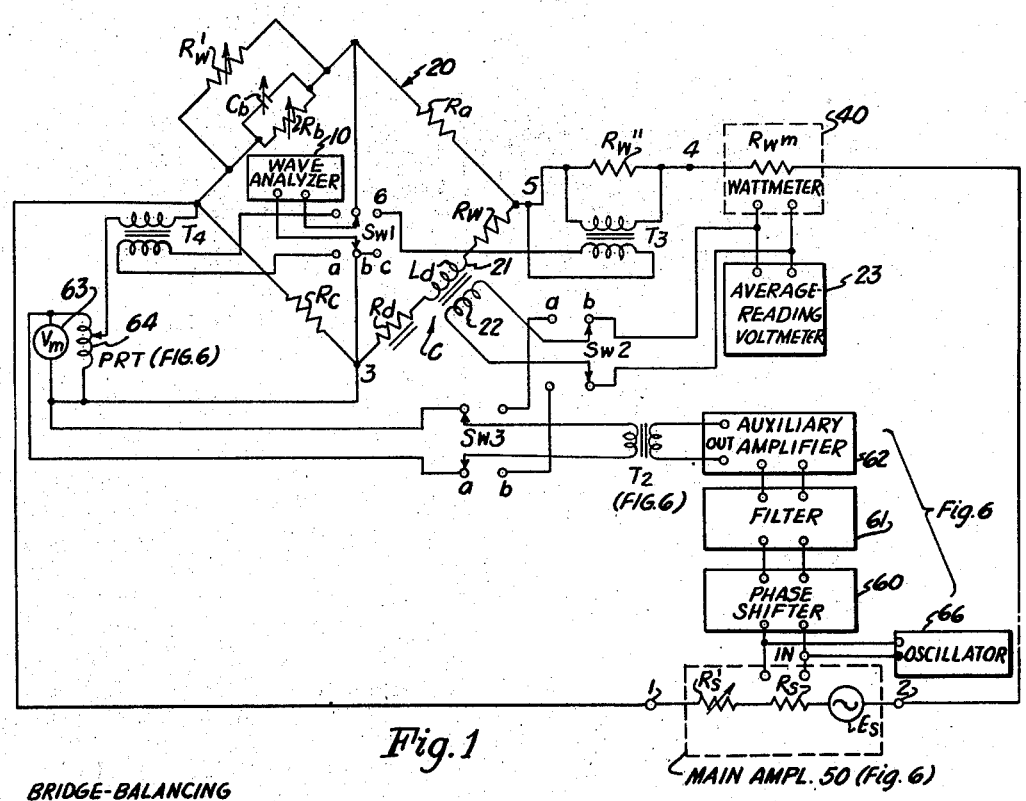
Fig. 1 is a complete circuit diagram of the present invention.

The power amplifier circuit shown in Fig. 5 forms part of the over-all test circuit of Fig. 1 and is symbolically represented as member 50 in Fig. 1. The value of the fundamental frequency current $I_1$ can be determined by measuring the fundamental frequency voltage drop across the resistive element $R_c$ (Figs. 2 and 3) forming one arm of the measuring bridge. A polar potentiometer method of measurement may be employed in order to effect the necessary accuracy in making such measurement.

A general description of the polar potentiometer can be found in the text "Electrical Measurements" by F. K. Harris published by Wiley and Company in 1952. The polar potentiometer method requires a reference voltage of the same frequency as the unknown signal. It must be variable in phase and amplitude together and means must be provided for the accurate determination of the amplitude. Fig. 6 is a block diagram of the polar potentiometer circuit employed in connection with the present invention to determine the fundamental frequency current $I_1$. It may be observed at this point in the description that the polar potentiometer circuit as detailed in Fig. 6 also forms part of the complete measuring circuit illustrated in Fig. 1 and corresponding parts described in connection with Fig. 6 have the same identity in Fig. 1.

Referring to Fig. 6, an oscillator 66 which also serves as the low-distortion source for the power amplifier 50 of Fig. 5 is fed to a phase shifter 60, capable of shifting the phase of the signal by any amount required. Any distortion introduced by phase shifter 60 is eliminated by a filter 61 which receives the output of the phase shifter. The filtered signal is then fed through an amplifier 62 to an isolation transformer T2. It may be noted at this point that isolation is especially important for measurement of the voltage drop across the resistor $R_c$, if both ends of the resistor are operated at non-ground potentials.

The accuracy of the polar potentiometer method is determined largely by the reference voltmeter 63 and the precision ratio transformer 64. The variable-phase reference voltage obtained from the amplifier 62 is fed to the primary of the precision ratio transformer 64 and is measured by the reference voltmeter 63. In actual practice the precision ratio transformer is provided with 5 decade switches, which enable the output voltage to be varied in steps as small as $1 \times 10^{-5} \times$ the input voltage. Voltmeter 63 is adjusted to have a zero scale correction at the reference input voltage, and the input is maintained at such level throughout the measurements. The measured voltages are determined in terms of a ratio, as determined from the setting of precision ratio transformer 64, times the reference voltage. In use, phase shifter 60 and precision ratio transformer 64 are adjusted until the detector 10 coupled between the adjustable arm of the precision ratio transformer and the bridge under test is nulled. Under such condition the output from the precision ratio transformer will match the fundamental components of the unknown signal in the bridge 20 both in phase and in amplitude.

The polar potentiometer circuit described in connection with Fig. 6 is also shown in the over-all circuit diagram of Fig. 1. A switch SW3 is provided to selectively couple the polar potentiometer circuit across the $R_c$ arm of bridge 20. In addition a second transformer T4 (Fig. 1) is employed between the PRT coil winding 64 and the bridge. The secondary transformer T4 can be selectively connected to null detector 10 through switch SW1.

*Determination of negative resistance compensation factor (setting of feedback control)*

In order to obtain the necessary high degree of accuracy with the instrument of the present invention proper compensations for the ohmic circuit resistance is necessary. Setting of the "Z" control R2 identified in connection with Fig. 5 which determines the amount of compensating negative resistance inserted, profoundly affects the apparent loss measured by the bridge. The functioning of the "Z" control R2 can best be understood by first considering compensation for the resistance of those elements of the circuit having accessible terminals. Fig. 7 shows the principles involved in such determination.

Fig. 7 shows a portion of the basic bridge circuit 20 discussed in connection with Figs. 2–4 including resistance arm $R_c$ and the test frame arm having the parameters $R_d$, $R_w$, and $L_d$, representing the electrical parameters of the test frame where $R_w$ is the resistance of the test frame primary winding 21. Fig. 7 shows in simplified form the bridge 20 as being energized by the power amplifier arrangement described and illustrated in Fig. 5. Such relationship is shown in greater detail in the over-all assembly of Fig. 1. If a tuned detector, such as a wave analyzer 10 (Fig. 1), were connected to points 1 and 2 in Fig. 7 and tuned to the third harmonic of the fundamental frequency, a setting of the "Z" control on the power amplifier 50 (Fig. 5) could be found that would result in a minimum deflection of the detector 10. The amplifier 50 should first be adjusted to supply a current sufficiently large to produce considerable harmonic components. $R_s'$ in Fig. 7 represents the value of the impedance resulting from the negative feedback in the amplifier. When a minimum deflection of the detector 10 has thus been obtained, the basic source resistance $R_s$ provided by amplifier 50 will be compensated by a value of $R_s'$ which will be equal in magnitude and opposite in sign to $R_s$. Similarly, if the detector is connected to terminals 2 and 3 in Fig. 7 and the "Z" control (Fig. 5) readjusted to produce a minimum deflection of detector 10 the bridge arm resistor $R_c$ is also compensated and $$R_s' = -[R_s + R_c] \qquad (3)$$

Similarly if the detector 10 is connected across terminals 3 and 4 in Fig. 7 compensation is obtained, for the resistances $R_s$, $R_c$, and $R_{wm}$ where $R_{wm}$ represents the resistance of wattmeter 40 (Fig. 4).

The resistance $R_w$ (the ohmic resistance of the test frame primary) cannot be isolated to perform the above procedure since it is associated with the test frame inductance $L_d$ and resistance $R_d$.

Therefore, in accordance with the principles of the present invention, a resistor $R_w''$ is employed (see Fig. 8) having an ohmic value exactly corresponding to that of $R_w$, the ohmic resistance of the test frame primary. The resistor $R_w''$ has negligible inductance and capacitance and is included in the test circuit as shown in simplified form in Fig. 8. Now if the referred-to detector is connected to terminals 3 and 5, and "Z" control R2 (Fig. 5) is again adjusted for minimum deflection, compensation is effected for $R_s$, $R_c$, $R_{wm}$, and $R_w''$.

Figure 8:
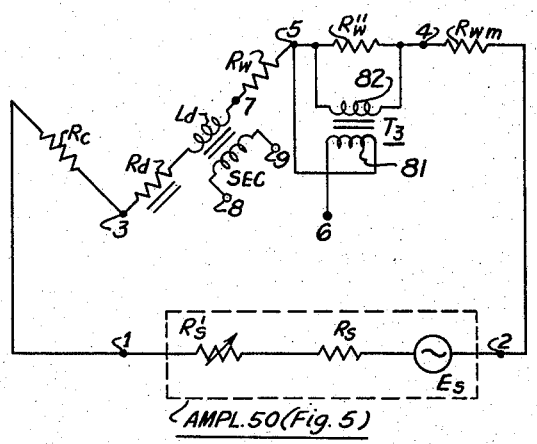
Fig. 8 is a circuit similar to Fig. 7 illustrating the manner in which the present invention provides for compensation of the ohmic resistances of the bridge circuit components.

Terminal 7 indicated in Fig. 8 symbolically portrays a phantom test point. Theoretically, by connecting the detector between terminal 3 and such phantom terminal 7, complete compensation of the total ohmic resistance of the test circuit would be achieved.

The present invention provides a convenient means for accomplishing such compensation. The inclusion of a transformer T3 as shown in Fig. 8 provides for a virtual connection to the phantom point 7. Transformer T3 has a unity ratio and negligible phase shift. The secondary 81 is connected so that the voltage in it opposes the IR drop in $R_w$, the resistance of the test frame primary 21. Since $R_w''$ is equal to $R_w$ as above indicated, the primary 82 of transformer T3 is connected across $R_w''$ as shown in Fig. 8 and the voltage across such primary is the IR drop across $R_w''$ which equals the IR drop across $R_w$. Now by connecting the detector to terminals 3 and 6, the same effect obtains as if it were possible to connect to terminals 3 and 7. With such connection, the "Z" control R2 (Fig. 5) is adjusted for minimum deflection.

The explanatory circuit shown in Fig. 8 for compensating for the ohmic resistance comprising $R_s$, $R_c$, $R_{wm}$, and $R_w$ is also shown in the over-all circuit diagram of Fig. 1 where the resistor $R_w''$ and transformer T3 are designated by like references. Test point 6 of Fig. 8 corresponds to contact 6 of switch SW1 in Fig. 1 so that the detector 10 can be selectively positioned across test points 3 and 6 as above described in connection with Fig. 8 when adjusting the "Z" control.

Setting the "Z" control as above described, using the third harmonic produced by the core material does not compensate for all harmonic distortion. The main power amplifier 50 necessarily produces some degree of harmonic distortion in its own circuit which is indistinguishable from that produced by the ferromagnetic test core material so that the final setting of the "Z" control is in reality affected by such unwanted factors.

The difficulties occasioned by distortion in the amplifier 50 are avoided in accordance with the practice of this invention by introducing a voltage at some point external to main amplifier 50 without changing the ohmic resistance of the circuit. Specifically, a voltage is applied to the secondary winding 22 of the test frame (see Figs. 1, 2, and 8). The specimen in the frame then serves as a transformer core, inducing a voltage signal in the primary 21. Detector 10 is tuned to the frequency of the injected voltage and the "Z" control is then adjusted as before for minimum deflection. The auxiliary source for injecting an external signal is readily available from the auxiliary amplifier 62 as shown in Fig. 1. The switches SW3 and SW2 provide means for selectively connecting such signal source to the secondary winding 22 of test frame C.

In such connection, it has been found that setting of the "Z" control is slightly dependent upon the amplitude of the injected voltage. Best results are obtained by adjusting this amplitude to yield about the same R.M.S current in the primary circuit with only the injected voltage, operating through the feedback circuit (i.e., no input to the main amplifier input terminals) as the R.M.S. current existing under testing conditions. That is, for a test point requiring exciting current of 1 amp. R.M.S., the "Z" control is set with the injected voltage adjusted to give 1 amp. R.M.S. in the primary circuit. The difference in "Z" control settings made with various injected voltages is small, however, and can be neglected if errors approaching 3 to 5 are permissible.

An obvious advantage of this latter method is that the frequency of the injected voltage may be chosen at will. By choosing several frequencies covering the range of the predominant harmonics of the frequency used for the tests, the setting of the "Z" control is practically the same for all frequencies in such range.

In connection with the above-described injected voltage technique, it is also necessary to consider the effect on the primary circuit resistance of the transferred impedance of the auxiliary circuit supplying the injected voltage. If this transferred impedance were to alter the net resistance of the primary circuit, then the result would be a false setting of the "Z" control. However, no errors arise here, because as the "Z" control approaches the correct setting, the net resistance of the primary circuit approaches zero, and the resistive component of the transferred impedance paralleling this zero resistance does not alter the total. This was verified experimentally. Various taps of the transformer employed in the auxiliary injection circuit were tried, and various loads connected across the frame between points 8 and 9 of Fig. 8. In all cases, the setting of the "Z" control was unaffected. That this setting also yielded correct core-loss measurements is further proof that no significant error arose from this source.

To obtain the power loss in the iron, the value of $R_d$, which is the apparent increase in the resistance of the frame, is required. Unavoidably, however, the ohmic resistance of the primary winding of the test frame, $R_w$, is included in the measured arm of the bridge. Two methods are available to separate these two components of resistance. $R_w$ can be determined independently and subtracted from the value obtained from the bridge measurement. Alternatively, the ohmic resistance can be compensated by an auxiliary component in parallel with the balancing arm of the bridge, as described by Dieterly and Ward in ASTM Bulletin 182 (1952). Specifically, an adjustable resistor $R_w'$ is paralleled with the balancing impedances $C_b$ and $R_b$ of bridge 20 as shown in Fig. 1. The two methods give identical results, and both were used successfully during the course of this investigation.

The manner in which the various elements and subassemblies described in connection with the simplified explanatory diagrams of Figs. 2–8 comprise the over-all test circuit shown in Fig. 1 is believed apparent from the above description. Corresponding elements identified in connection with the illustrative diagrams of Figs. 2–8 are identified by like legends in the diagram of Fig. 1. The selector switches are shown in Fig. 1 in the proper positions for balancing the bridge.

The bridge 20 shown in Fig. 1 corresponds to the bridge shown in the simplified diagram of Fig. 2 and comprises the resistance arms $R_a$, $R_b$ and $R_c$. The Epstein test frame C comprising the fourth arm of the bridge 20 is designated in Fig. 1 by the equivalent resistances $R_d$, $R_w$, and inductance $L_d$. The test frame primary winding 21 and secondary 22 are also indicated.

The average reading voltmeter 23 the function of which was described in connection with Figs. 2 and 4 is also shown in Fig. 1 as being selectively connectable to the test frame secondary winding 22 through a switch SW2 to form the test circuit described in Fig. 2.

The wattmeter 40 described in connection with Fig. 4 is also indicated in Fig. 1. Similarly the resistance compensating test circuit of Fig. 8 including transformer T3, resistor $R_w''$, and test terminals 1–8 are also shown in Fig. 1. One winding of the transformer T3 in Fig. 1 is connected across the auxiliary resistor $R_w''$. The remaining winding of T3 is connected to contact 6 of switch SW1 in Fig. 1 and is adapted to be connected to the previously discussed detector which is in the form of a wave analyzer 10 in Fig. 1.

The previously described polar potentiometer circuit of Fig. 6 for measuring the value of the fundamental frequency current in the test frame is also shown in Fig. 1. As indicated, the polar potentiometer circuit of Fig. 6 is represented by elements 60, 61, 62, 66, transformer T2 and the adjustable precision ratio transformer 64. A switch SW3 is provided to selectively couple the polar potentiometer circuit to the bridge 20.

The construction and operation of the over-all test circuit of Fig. 1 will be apparent from the above-detailed descriptions of the individual test circuits shown in Figs. 2–8. With harmonic power losses fully compensated by means of the feedback circuit as has been described in detail, the power loss in the iron core test is from Equation 2

$$P_d = I_1^2 R_d \quad (4)$$

Only two quantities need therefore be measure, $I_1$ and $R_d$. The manner of employing the test circuit of Fig. 1 in measuring these quantities can now be conveniently summarized.

As previously mentioned, the resistor $R_w'$ is not essential to the operation of the test circuit but is employed in accordance with the teachings of Dieterly and Ward in ASTM Bulletin 182, 1952. As disclosed in such publication if the value of the resistor $R_w'$ is made equal to $$R_w' = \frac{R_a R_c}{R_w} \quad (5a)$$

then $$R_d = \frac{R_a R_c}{R_b} \quad (5b)$$

The use of such resistor therefore simplifies the determination of $R_d$ for use in Equation 4 by obviating the need for subtracting $R_w$ from each resistance measurement. If $R_w'$ is not used then $$R_d = \frac{R_a R_c}{R_b} - R_w \quad (5c)$$

When the resistor $R_w'$ is employed, it is set to compensate for $R_w$ in accordance with the procedure outlined in the referred-to ASTM Bulletin No. 182 (1952).

The test specimen is then inserted in the Epstein test frame to form an arm of bridge 20 as was described in connection with Figs. 2-4. Switch SW2 is placed in position marked "a" in Fig. 1 and switch SW3 is placed in position marked "b." From Fig. 1 it will be apparent that such positioning of switches SW2 and SW3 will connect auxiliary amplifier 62 to coil 22 of the test frame. The main power amplifier 50 is not energized during such procedure.

The detector 10, tuned to the injected-signal frequency is then connected to connection points 3 and 6 by placing switch SW1 in position "c." In such condition of the circuit of Fig. 1 the "Z" control comprising part of the main amplifier mechanism 50 as detailed in Fig. 5 can be adjusted for minimum deflection of the detector 10 as was described in detail in connection with the description of Fig. 8.

The detector 10 is then connected to the bridge 20 by adjusting switch SW1 to position "b" in Fig. 1 and the test frame secondary winding 22 is connected to the wattmeter 40 and voltmeter 23 by switching SW2 to position "b." A voltage is then applied to the bridge by energizing the main power amplifier 50 and the bridge is then balanced by adjusting $R_b$ and $C_b$.

The polar potentiometer measuring circuit (Fig. 6) is then employed (SW3 in position "a," SW1 in position "a") to measure the voltage at fundamental frequency appearing across $R_c$ as was described in connection with Fig. 6.

The average-reading voltmeter 23 and the reference wattmeter 40 (with $R_a$ disconnected as described) are read to complete the measurements.

Figure 9A:
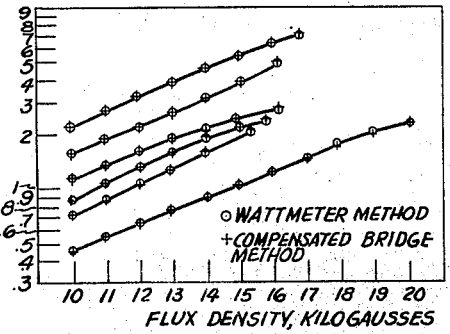
Fig. 9A is a series of curves showing a comparison between core losses obtained by measurement with the apparatus of the present invention and those obtained by the wattmeter method.

Actual comparisons of core-loss measurements made with the apparatus of the present invention agree within 2.5% or better with those determined by the prior wattmeter method. The curves of Fig. 9A show the close correlation between the core losses determined in actual test runs on various core samples with the present apparatus (compensated bridge method) and the wattmeter method respectively.

Figure 9B:
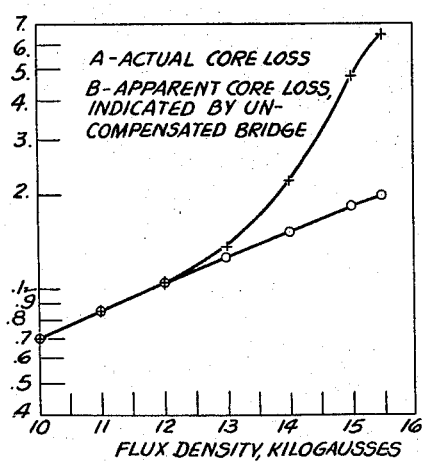
Fig. 9B is a curve illustrating the increased accuracy obtainable by employing a compensated bridge in accordance with the principles of this invention.

Fig. 9B clearly illustrates the magnitude of the correction effected by the compensation mechanisms described in connection with the present invention. For comparison, a series of measurements were made employing the test circuit of Fig. 1 but not employing any feedback compensation. The uncorrected apparent core loss $I_1^2 R_d$ is shown by curve B in Fig. 9B increasingly diverging from the true core loss as represented by curve A, with increase in flux density. Without the compensation provided by the apparatus of this invention, the core loss determinations would therefore be several hundred percent too high at the highest flux densities.

It will be apparent that the embodiments shown are only exemplary and that various modifications can be made in construction and arrangement within the scope of invention as defined in the appended claims.

What is claimed is:

1. A test circuit for determining the core loss in ferromagnetic core materials especially at high flux densities comprising a bridge, means for including the test material in one arm of said bridge as an electrical element, a source of alternating-current power including a power amplifier connected to said bridge, and means for varying the internal impedance of said amplifier to provide an equivalent negative resistance in said test circuit for compensating for the ohmic resistance in said test circuit comprising adjustable current feedback means connecting said amplifier output to its input.

2. The invention of claim 1 in which said adjustable current feedback means comprises a resistor in series with the amplifier output, an adjustable potentiometer shunting said resistor and an isolation transformer having a primary connected to the adjustable element of said potentiometer and a secondary connected through a feedback circuit to the input of said amplifier.

3. The invention of claim 1 in which said means for including the test material in one arm of said bridge comprises a test frame having a primary winding forming said bridge arm and a secondary winding, a wattmeter and voltage indicating device and switch means for selectively connecting said voltage indicating device and the voltage coil of said wattmeter to said secondary winding of said test frame.

4. A test circuit for determining the core loss in ferromagnetic core material comprising a bridge, means for including the test material in one arm of said bridge comprising an Epstein frame having a primary winding connected in said bridge arm, a source of alternating-current power including a high-power amplifier connected to said bridge, means for varying the internal impedance of said amplifier to provide an equivalent negative resistance in said test circuit for compensating for the ohmic resistance in said test circuit comprising adjustable current feedback means connecting said amplifier output to its input, means for compensating for $R_w$, the ohmic resistance of said primary winding comprising a noninductive, low capacity resistor connected in said test circuit having an ohmic value $R_w''$ equal to $R_w$ and indicating means for indicating the voltage drop across said primary and compensating resistor $R_w''$ in respect to adjusting of said amplifier impedance varying means.

5. The invention of claim 4 including means for compensating for the total ohmic resistance of the test circuit comprising a transformer of negligible phase shift having a primary winding connected across said compensating resistor in phase opposition to the voltage drop in said bridge arm and a secondary, one terminal of said secondary winding connected to said bridge arm containing the test frame, the second terminal of said secondary providing a test terminal for measuring the voltage drop across said bridge arm in response to adjustment of said amplifier internal impedance varying means.

6. The invention of claim 5 in which said indicator means comprises a null detector and switch means for selectively connecting said null detector to one terminal of said bridge and to said test terminal of said transformer secondary.

7. The invention of claim 5 including means for determining the degree of adjustment of said current feedback means comprising means for injecting an A.C. voltage in said test circuit without changing the ohmic resistance thereof, said last named means comprising a secondary winding on said test frame, an auxiliary signal source and means for selectively applying an A.C. signal from said auxiliary source to said secondary having an amplitude corresponding to that of the R.M.S. current in the test circuit when energized by said power amplifier.

8. A test circuit for determining the core loss in ferromagnetic core material comprising a bridge having product arms and a bridge balancing arm, means for including the test material in the remaining arm of said bridge comprising an Epstein test frame having a primary winding connected in said remaining arm and a secondary winding, a source of alternating-current power including a high-power amplifier connected to said bridge, means for varying the internal impedance of said power amplifier to provide an equivalent negative resistance in said test circuit for compensating for the ohmic resistance in said test circuit comprising adjustable current feedback means connecting said amplifier output to its input, means for precisely determining the fundamental frequency voltage drop across one of said product arms comprising a reference signal source having a frequency corresponding to that of said power amplifier, means for varying the phase and amplitude of said reference signal and means for selectively connecting said modified reference signal across said bridge arm.

9. The invention of claim 8 in which said selectively connecting means includes an isolation transformer.

10. The invention of claim 9 including a second transformer having a primary connecting the modified output of said reference source to said bridge arm and a secondary, a null detector and switch means for selectively connecting said null detector to said secondary.

References Cited in the file of this patent

UNITED STATES PATENTS 2,704,826    Wiegand _____ Mar. 22, 1955